United States Patent
Kigasawa et al.

(10) Patent No.: US 10,870,222 B2
(45) Date of Patent: Dec. 22, 2020

(54) RELEASE AGENT FOR VULCANIZED RUBBER MOLDING

(71) Applicant: DAI-ICHI KOGYO SEIYAKU CO., LTD., Kyoto (JP)

(72) Inventors: Shigeru Kigasawa, Kyoto (JP); Toshikazu Nabeshima, Kyoto (JP); Takuya Horie, Kyoto (JP)

(73) Assignee: DAI-ICHI KOGYO SEIYAKU CO., LTD., Kyoto (JP)

( * ) Notice: Subject to any disclaimer, the term of this patent is extended or adjusted under 35 U.S.C. 154(b) by 434 days.

(21) Appl. No.: 15/569,834

(22) PCT Filed: Jan. 18, 2016

(86) PCT No.: PCT/JP2016/051272
§ 371 (c)(1),
(2) Date: Oct. 27, 2017

(87) PCT Pub. No.: WO2016/185730
PCT Pub. Date: Nov. 24, 2016

(65) Prior Publication Data
US 2018/0126602 A1 May 10, 2018

(30) Foreign Application Priority Data
May 15, 2015 (JP) .................... 2015-099826

(51) Int. Cl.
| B29C 33/62 | (2006.01) |
| C08L 71/02 | (2006.01) |
| C10M 173/02 | (2006.01) |
| C08G 65/08 | (2006.01) |
| C08L 71/00 | (2006.01) |
| C08G 65/26 | (2006.01) |
| C10N 20/04 | (2006.01) |
| C10N 40/36 | (2006.01) |

(52) U.S. Cl.
CPC .............. *B29C 33/62* (2013.01); *C08G 65/08* (2013.01); *C08G 65/2609* (2013.01); *C08G 65/2615* (2013.01); *C08L 71/00* (2013.01); *C08L 71/02* (2013.01); *C10M 173/02* (2013.01); *C08G 2125/00* (2013.01); *C08L 2205/02* (2013.01); *C10M 2207/022* (2013.01); *C10M 2209/109* (2013.01); *C10M 2209/1045* (2013.01); *C10M 2209/1055* (2013.01); *C10M 2209/1075* (2013.01); *C10M 2229/02* (2013.01); *C10N 2020/04* (2013.01); *C10N 2040/36* (2013.01)

(58) Field of Classification Search
CPC .... B29C 33/62; C08G 65/08; C08G 65/2609; C08G 65/2615; C08G 2125/00; C08G 2205/02; C08L 71/00; C08L 71/02; C10M 173/02; C10M 2209/1055; C10M 2209/1075; C10M 2209/109; C10M 2229/02; C10M 2220/021; C10M 2240/58; C10M 2207/022
USPC ........................................................ 524/377
See application file for complete search history.

(56) References Cited

U.S. PATENT DOCUMENTS

| 5,753,368 A * | 5/1998 | Berke ................. C04B 20/1022 106/711 |
| 6,403,063 B1 * | 6/2002 | Sawyer .................. A61K 8/494 424/401 |
| 2012/0090504 A1 | 4/2012 | Kaneumi et al. |

FOREIGN PATENT DOCUMENTS

| CN | 102458789 | 5/2012 |
| JP | 58-132090 A | 8/1983 |
| JP | 11-255894 A | 9/1999 |
| JP | 2008-201010 A | 9/2008 |

OTHER PUBLICATIONS

International Search Report dated Feb. 16, 2016, in PCT/JP2016/051272 filed Jan. 18, 2016.
Office Action in Chinese Application No. 201680028130.3 dated Jan. 2019. (w/English Translation).
Office Action in Chinese Application No. 201680028130.3 dated Jul. 23, 2019. (w/English Translation).

* cited by examiner

*Primary Examiner* — William K Cheung
(74) *Attorney, Agent, or Firm* — Oblon, McClelland, Maier & Neustadt, L.L.P.

(57) ABSTRACT

Provided is a release agent for vulcanized rubber molding, the release agent exhibiting good mold releasability between a mold and a rubber after vulcanization and capable of being easily removed after production. The release agent for vulcanized rubber molding contains a polyoxyalkylene glyceryl ether (A). The polyoxyalkylene glyceryl ether (A) contains 50% to 95% by mass of oxyethylene groups in 100% by mass of oxyalkylene groups. The polyoxyalkylene glyceryl ether (A) preferably has a number-average molecular weight of 2,000 to 20,000.

16 Claims, No Drawings

RELEASE AGENT FOR VULCANIZED RUBBER MOLDING

This international application is a Section 371 National Stage Application of International Application No. PCT/JP2016/051272, filed Jan. 18, 2016, and claims the benefit of Japanese Patent Application No. 2015-099826 filed on May 15, 2015 with the Japan Patent Office, the entire disclosures of which are incorporated herein by reference.

TECHNICAL FIELD

The present invention relates to a release agent for vulcanized rubber molding.

BACKGROUND ART

Vulcanized rubber is used in, for example, automobile parts, railway parts, and construction machines. Such vulcanized rubber is obtained by feeding a rubber composition into a mold or the like, vulcanization-molding the rubber composition, and detaching the resulting molded article. In order to easily perform the detachment, a release agent is applied to the mold.

Silicones are used as such a release agent. In order to remove the release agent adhering to a rubber hose after vulcanization, it is necessary to use a detergent or the like, and thus an improvement therefor has been desired. In view of this, Patent Literature 1 discloses, as a release agent that can be easily removed, an alkylene oxide adduct of a glycerin fatty acid ester.

CITATION LIST

Patent Literature

PTL 1: Japanese Unexamined Patent Application Publication No. 2008-201010

SUMMARY OF INVENTION

Technical Problem

However, the release agent described in Patent Literature 1 has a problem in that sufficient mold releasability is not obtained unless a large amount of release agent is used. In addition, with an increase in the amount of release agent used, the amount of wash water for removing the release agent is also increased, resulting in a problem of a high drainage load.

In view of this, the present invention provides a release agent that exhibits good mold releasability between a mold and a rubber after vulcanization and that can be removed with a relatively small amount of wash water.

Solution to Problem

A release agent for vulcanized rubber molding according to the present invention contains a polyoxyalkylene glyceryl ether (A), in which the polyoxyalkylene glyceryl ether (A) contains 50% to 95% by mass of oxyethylene groups when a total content of oxyalkylene groups is assumed to be 100% by mass.

Preferably, the release agent for vulcanized rubber molding according to the present invention further contains a polyoxyalkylene diol (B) in addition to the polyoxyalkylene glyceryl ether (A).

Advantageous Effects of Invention

The release agent for vulcanized rubber molding exhibits good mold releasability between a mold and a rubber after vulcanization and can be removed from a surface of the vulcanized rubber with a relatively small amount of wash water, thus exhibiting good removability.

DESCRIPTION OF EMBODIMENTS

A release agent for vulcanized rubber molding according to the present invention contains a polyoxyalkylene glyceryl ether (A), in which the polyoxyalkylene glyceryl ether (A) contains 50% to 95% by mass of oxyethylene groups when a total content of oxyalkylene groups is assumed to be 100% by mass.

Use of a polyoxyalkylene glyceryl ether having a high content of oxyethylene groups enables removability after vulcanization molding to improve. Furthermore, since this content is 50% to 95% by mass, mold releasability between a mold and a rubber after vulcanization can be improved. The content of oxyethylene groups is preferably 60% to 90% by mass and more preferably 70% to 85% by mass when the total content of oxyalkylene groups is assumed to be 100% by mass.

The oxyalkylene groups in the polyoxyalkylene glyceryl ether (A) used in this embodiment may include oxypropylene groups, oxybutylene groups, and the like besides the oxyethylene groups. The content of the oxyalkylene groups other than oxyethylene groups is preferably 5% to 50% by mass, more preferably 10% to 40% by mass, and still more preferably 15% to 30% by mass when the total content of oxyalkylene groups is assumed to be 100% by mass. The oxyalkylene groups other than oxyethylene groups are preferably oxypropylene groups because better removability is obtained.

The polyoxyalkylene glyceryl ether (A) used in this embodiment preferably has a number-average molecular weight (Mn) of 2,000 to 20,000. Use of a polyoxyalkylene glyceryl ether having such a number-average molecular weight enables the viscosity of the release agent to further decrease and to improve workability. The polyoxyalkylene glyceryl ether (A) more preferably has a number-average molecular weight of 3,000 to 10,000.

The method for producing the polyoxyalkylene glyceryl ether (A) is not particularly limited. The polyoxyalkylene glyceryl ether (A) can be produced by using a known method for synthesizing the polyoxyalkylene glyceryl ether. For example, when the production is performed by alkylene oxide addition polymerization, the polyoxyalkylene glyceryl ether (A) is obtained by adding an alkali catalyst or an acid catalyst to glycerin and allowing an alkylene oxide to react with the glycerin at 80° C. to 150° C. When two or more types of alkylene oxides are added, the addition form may be block addition, random addition, or a combination thereof. Of these, the addition form preferably includes random addition because the viscosity of the release agent is further decreased to improve workability.

The release agent for vulcanized rubber molding according to this embodiment preferably further contains a polyoxyalkylene diol (B) in addition to the polyoxyalkylene glyceryl ether (A). By incorporating the polyoxyalkylene diol (B), the mold releasability and the removability are further enhanced.

The polyoxyalkylene diol (B) used in this embodiment preferably contains 20% to 80% by mass of oxyethylene groups when a total amount of oxyalkylene groups contained in the polyoxyalkylene diol (B) is assumed to be 100% by mass. When the content of the oxyethylene groups is within the above range, the mold releasability and the removability are further enhanced. The content of the oxyethylene groups is preferably 30% to 75% by mass and more preferably 40% to 70% by mass.

The polyoxyalkylene diol (B) preferably has a number-average molecular weight (Mn) of 2,000 to 20,000. Use of a polyoxyalkylene diol having such a number-average molecular weight enables the viscosity of the release agent to further decrease and to improve workability. The polyoxyalkylene diol (B) more preferably has a number-average molecular weight of 3,000 to 10,000.

The method for producing the polyoxyalkylene diol (B) is not particularly limited. The polyoxyalkylene diol (B) can be produced by using a known method for synthesizing the polyoxyalkylene diol (B). For example, when the production is performed by alkylene oxide addition polymerization, the polyoxyalkylene diol (B) is obtained by adding an alkali catalyst or an acid catalyst to a diol and allowing an alkylene oxide to react with the diol at 80° C. to 150° C. When two or more types of alkylene oxides are added, the addition form may be block addition, random addition, or a combination thereof. Of these, the addition form preferably includes block addition because the mold releasability and the removability are further enhanced.

Examples of the diol that can be used in the production of the polyoxyalkylene diol (B) include, but are not particularly limited to, ethylene glycol, 1,2-propylene glycol, 1,3-propylene glycol, 1,2-butanediol, 1,3-butanediol, 1,4-butanediol, 1,5-pentanediol, 1,6-hexanediol, and 3-methyl-1,5-pentanediol.

The content of the polyoxyalkylene diol (B) is preferably 20 to 500 parts by mass relative to 100 parts by mass of the polyoxyalkylene glyceryl ether (A). When the content is within the above range, the mold releasability and the removability are further enhanced. The content of the polyoxyalkylene diol (B) is more preferably 30 to 300 parts by mass and still more preferably 40 to 250 parts by mass relative to 100 parts by mass of the polyoxyalkylene glyceryl ether (A).

The release agent for vulcanized rubber molding according to the present invention may be a release agent diluted with water. Examples thereof include release agents obtained by diluting with water such that the concentration of the polyoxyalkylene glyceryl ether (A) or a mixture of the polyoxyalkylene glyceryl ether (A) and the polyoxyalkylene diol (B) becomes 10% to 60% by mass and more preferably 20% to 40% by mass.

The release agent for vulcanized rubber molding according to the present invention may contain known release agent components such as a surfactant, e.g., a nonionic surfactant or an anionic surfactant, and a silicone as long as the effects thereof are not impaired.

The release agent for vulcanized rubber molding according to the present invention can be used for known rubber such as acrylonitrile-butadiene copolymer rubber (NBR), ethylene-propylene-diene copolymer rubber (EPDM), rubber obtained by blending NBR and polyvinyl chloride (PVC) (NBR/PVC), acrylic rubber (ACM), and fluororubber (FKM). The rubber may contain known additives such as a vulcanizing agent, a vulcanizing aid, a processing aid, a plasticizer, a process oil, a carbon black, a white filler, and an age resistor.

Vulcanization molding of the rubber can be conducted in accordance with an ordinary method. For example, the release agent according to the present invention is applied to a mold, a rubber is fed into the mold, and heating and vulcanization are then conducted. After vulcanization, the rubber is removed from the mold. The release agent adhering to the surface of the rubber is washed with water, warm water, or the like to thereby obtain vulcanized rubber.

EXAMPLES

Hereinafter, the present invention will be described in more detail by way of Examples. The present invention is not limited to the Examples.

The number-average molecular weight and the content of oxyethylene groups relative to oxyalkylene groups were measured by the methods described below.

(Method for Measuring Number-Average Molecular Weight)

The number-average molecular weights were determined by gel permeation chromatography (GPC). A GPC apparatus and analysis conditions are as follows. Values determined by calibrating using, as standard samples, polyethylene glycols having molecular weights of 327, 2,000, 8,250 and 19,700 were used as the number-average molecular weights.

GPC apparatus: System controller: SCL-10A (available from Shimadzu Corporation)

Detector: RID-10A (available from Shimadzu Corporation)

Column: Shodex GPC KF-G, KF-803, KF802.5, KF-802, and KF-801 that are connected together (all of which are available from Showa Denko K.K.)

Eluent: tetrahydrofuran

Sample injection: 0.5 wt % solution, 80 μL

Flow rate: 0.8 mL/min

Temperature: 25° C.

(Content of Oxyethylene Groups Relative to Oxyalkylene Groups)

The content of oxyethylene groups relative to oxyalkylene groups was calculated by $^1$H-NMR (solvent: $CDCl_3$).

Raw materials used in Examples are as follows.

<Polyoxyalkylene Glyceryl Ether (A)>

Polyoxyalkylene glyceryl ethers obtained by adding the alkylene oxides shown in Table 1 to 1 mole of glycerin were used. Note that, in the table, in the type and amount of alkylene oxide used, the symbol "EO" represents the amount of ethylene oxide used, the symbol "PO" represents the amount of propylene oxide used, and each of "EO" and "PO" represents an amount (mol) used relative to 1 mole of glycerin. In the oxyalkylene group content, the symbol "EO" represents the content of oxyethylene groups, the symbol "PO" represents the content of oxypropylene groups, and each of "EO" and "PO" represents a content when a total content of oxyalkylene groups is assumed to be 100% by mass.

TABLE 1

| | Type and amount of alkylene oxide used (mol) | | Oxyalkylene group content (mass %) | | Addition form | Number-average molecular weight |
|---|---|---|---|---|---|---|
| | EO | PO | EO | PO | | |
| A-1 | 10 | 5 | 60 | 40 | Random | 800 |
| A-2 | 30 | 10 | 69 | 31 | Random | 2000 |
| A-3 | 100 | 10 | 88 | 12 | Random | 5000 |
| A-4 | 130 | 25 | 80 | 20 | Random | 7000 |
| A-5 | 100 | 50 | 60 | 40 | Random | 7400 |
| A-6 | 200 | 50 | 75 | 25 | Random | 12000 |
| a-1 | 50 | 100 | 28 | 72 | Random | 8000 |

<Polyoxyalkylene Diol (B)>

Polyoxyalkylene diols obtained by adding alkylene oxides to 1 mole of a diol, the types and ratio of alkylene oxides and the type of diol being shown in Table 2, were used. Note that, in the table, in the type and amount of each alkylene oxide, the symbol "EO" represents ethylene oxide, and the symbol "PO" represents propylene oxide. In the oxyalkylene group content, the symbol "EO" represents the content of oxyethylene groups, the symbol "PO" represents the content of oxypropylene groups, and each of "EO" and "PO" represents a content when a total content of oxyalkylene groups is assumed to be 100% by mass.

TABLE 2

| | Diol | Type and amount of alkylene oxide used (mol) | | Oxyalkylene group content (mass %) | | Addition form | Number-average molecular weight |
|---|---|---|---|---|---|---|---|
| | | EO | PO | EO | PO | | |
| B-1 | Propylene glycol | 28 | 20 | 50 | 50 | Block | 2400 |
| B-2 | Propylene glycol | 45 | 34 | 50 | 50 | Block | 4000 |
| B-3 | Propylene glycol | 64 | 20 | 70 | 30 | Block | 4000 |

<Other Raw Materials>
(c-1) Glycerin
(c-2) Polyethylene glycol (number-average molecular weight: 4,000)
(c-3) Dimethylpolysiloxane (Trade name: KF-96-20CS, available from Shin-Etsu Chemical Co., Ltd.)
(c-4) Alkylene oxide adduct of glycerin fatty acid ester An alkylene oxide adduct (c-4) of a glycerin fatty acid ester was obtained by conducting the same operation as in polyoxyalkylene glyceryl ether (A-5) except that, in polyoxyalkylene glyceryl ether (A-5), 1 mole of glycerol monolaurate was used instead of glycerin.

Examples 1 to 9 and Comparative Examples 1 to 6

Release agents were obtained by mixing raw materials in the ratios (mass ratios) shown in Table 3 below.
Evaluations described below were conducted by using each of the release agents. Note that "dimethylpolysiloxane" is KF-96-20CS (trade name) available from Shin-Etsu Chemical Co., Ltd.

(Mold Releasability)

An unvulcanized rubber (acrylonitrile-butadiene copolymer rubber (NBR) or chloroprene rubber (CR)) to which a release agent was applied was fed into a mold (120×120×2 mm). Subsequently, a vulcanizing treatment was conducted at 150° C. for one hour, and the resulting vulcanized rubber was removed from the mold. Workability at this time was defined as mold releasability and evaluated in accordance with the criteria described below. Table 3 shows the results.

B: The workability is substantially the same as that when dimethylpolysiloxane is used.

C: The workability is inferior to that when dimethylpolysiloxane is used.

(Removability)

The vulcanized rubber obtained in the evaluation of the mold releasability was immersed in 2 L of water (temperature: 80° C.). After one minute and two minutes from the start of the immersion, whether the surface of the vulcanized rubber was slimy was examined, and an evaluation was conducted in accordance with the criteria described below. When the surface of the vulcanized rubber is slimy, the result shows the presence of residual release agent. When the surface of the vulcanized rubber is not slimy, the result shows the absence of residual release agent. Table 3 shows the results.

A: After immersion for one minute, the surface of the vulcanized rubber is not slimy.

B: After immersion for two minutes, the surface of the vulcanized rubber is not slimy.

C: After immersion for two minutes, the surface of the vulcanized rubber is still slimy.

TABLE 3

| | | Example | | | | | | | | | Comparative Example | | | | | |
|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 |
| Raw material | A-1 | 25 | | | | | | 10 | 7.5 | 5 | | | | | | |
| | A-2 | | 25 | | | | | | | | | | | | | |
| | A-3 | | | 25 | | | | | | | | | | | | |
| | A-4 | | | | 25 | | | | | | | | | | | |
| | A-5 | | | | | 25 | | | | | | | | | | |
| | A-6 | | | | | | 25 | | | | | | | | | |
| | B-1 | | | | | | | 5 | | | | | | | | |
| | B-2 | | | | | | | | 7.5 | | | | | | | |
| | B-3 | | | | | | | | | 10 | | | | | | |
| | a-1 | | | | | | | | | | 25 | | | | | |
| | c-1 | | | | | | | | | | | 25 | | | | |
| | c-2 | | | | | | | | | | | | 25 | | | |
| | c-3 | | | | | | | | | | | | | 100 | | |
| | c-4 | | | | | | | | | | | | | | 25 | 35 |
| | Water | 75 | 75 | 75 | 75 | 75 | 75 | 85 | 85 | 85 | 75 | 75 | 75 | 0 | 75 | 65 |
| | NBR | | | | | | | | | | | | | | | |
| Evaluation | Mold releasability | B | B | B | B | B | B | B | B | B | C | C | B | C | B |  |
| | Removability | A | A | A | A | A | A | A | A | A | C | A | A | C | B | C |
| | CR | | | | | | | | | | | | | | | |
| | Mold releasability | B | B | B | B | B | B | B | B | B | C | C | B | C | B |  |
| | Removability | A | A | A | A | A | A | A | A | A | C | A | A | C | B | C |

As is apparent from Table 3, the release agents for vulcanized rubber molding according to the present invention each exhibit a good removability and a good mold releasability. The results also show that sufficient mold releasability is obtained even with a small amount of release agent by using the polyoxyalkylene glyceryl ether (A) and the polyoxyalkylene diol (B) in combination. In contrast, the results show that, as in Comparative Example 1, when the content of oxyethylene groups is low, the removability is not good. The results also show that, as in Comparative Examples 2 and 3, when glycerin or polyethylene glycol is used, the mold releasability is not good. The results also show that, as in Comparative Example 4, when dimethylpolysiloxane is used, the removability is not good. As in Comparative Example 5, when the alkylene oxide adduct of the glycerin fatty acid ester is used, the mold releasability is not good, and there is room for improvement in the removability. The results also show that, as in Comparative Example 6, when the alkylene oxide adduct of the glycerin fatty acid ester is used in a large amount in order to enhance the mold releasability, the removability significantly decreases.

The invention claimed is:

1. A release agent, comprising:
   a polyoxyalkylene glyceryl ether (A), which contains 50% to 95% by mass of oxyethylene groups based on a total content of oxyalkylene groups in the release agent, wherein the oxygen atom(s) at the end(s) of the polyoxyalkylene chain(s) of the polyoxyalkylene glyceryl ether is(are) connected with H; and
   a polyoxyalkylene diol (B).

2. The release agent according to claim 1, wherein the polyoxyalkylene glyceryl ether (A) has a number-average molecular weight of 2,000 to 20,000.

3. The release agent according to claim 1, wherein the polyoxyalkylene diol (B) has a number-average molecular weight of 2,000 to 20,000.

4. The release agent according to claim 1, wherein a content of the polyoxyalkylene dial (B) is 20 to 500 parts by mass relative to 100 parts by mass of the polyoxyalkylene glyceryl ether (A).

5. The release agent according to claim 2, wherein the polyoxyalkylene diol (B) has a number-average molecular weight of 2,000 to 20,000.

6. The release agent according to claim 5, wherein a content of the polyoxyalkylene dial (B) is 20 to 500 parts by mass relative to 100 parts by mass of the polyoxyalkylene glyceryl ether (A).

7. A release agent, comprising:
   a polyoxyalkylene glyceryl ether (A), which contains 50% to 95% by mass of oxyethylene groups based on a total content of oxyalkylene groups in the release agent, wherein the polyoxyalkylene glyceryl ether is a reaction product of a glycerin mainly with only alkylene oxide(s).

8. The release agent according to claim 7, wherein the polyoxyalkylene glyceryl ether (A) has a number-average molecular weight of 2,000 to 20,000.

9. The release agent according to claim 7, further comprising:
   a polyoxyalkylene diol (B).

10. The release agent according to claim 9, wherein a content of the polyoxyalkylene dial (B) is 20 to 500 parts by mass relative to 100 parts by mass of the polyoxyalkylene glyceryl ether (A).

11. The release agent according to claim 8, further comprising:
    a polyoxyalkylene diol (B).

12. The release agent according to claim 11, wherein a content of the polyoxyalkylene dial (B) is 20 to 500 parts by mass relative to 100 parts by mass of the polyoxyalkylene glyceryl ether (A).

13. A release agent, comprising:
    a polyoxyalkylene glyceryl ether (A), which contains 50% to 95% by mass of oxyethylene groups based on a total content of oxyalkylene groups in the release agent, and
    a polyoxyalkylene diol (B).

14. The release agent according to claim 13, wherein the polyoxyalkylene glyceryl ether (A) has a number-average molecular weight of 2,000 to 20,000.

15. The release agent according to claim 14, wherein a content of the polyoxyalkylene diol (B) is 20 to 500 parts by mass relative to 100 parts by mass of the polyoxyalkylene glyceryl ether (A).

16. The release agent according to claim 13, wherein a content of the polyoxyalkylene diol (B) is 20 to 500 parts by mass relative to 100 parts by mass of the polyoxyalkylene glyceryl ether (A).

* * * * *